(12) United States Patent
Komura et al.

(10) Patent No.: US 11,500,211 B2
(45) Date of Patent: Nov. 15, 2022

(54) DISPLAY DEVICE

(71) Applicant: Japan Display Inc., Tokyo (JP)

(72) Inventors: Shinichi Komura, Tokyo (JP); Koichi Okuda, Tokyo (JP); Ken Onoda, Tokyo (JP); Hiroaki Kijima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/450,482

(22) Filed: Oct. 11, 2021

(65) Prior Publication Data

US 2022/0113544 A1  Apr. 14, 2022

(30) Foreign Application Priority Data

Oct. 12, 2020  (JP) .............................. JP2020-171844

(51) Int. Cl.
   *G02B 27/01*   (2006.01)
   *G02F 1/1335*  (2006.01)
   *G02F 1/13363* (2006.01)

(52) U.S. Cl.
   CPC ... *G02B 27/0172* (2013.01); *G02F 1/133536* (2013.01); *G02F 1/133555* (2013.01); *G02F 1/133638* (2021.01)

(58) Field of Classification Search
   None
   See application file for complete search history.

(56) References Cited

U.S. PATENT DOCUMENTS

| | | | |
|---|---|---|---|
| 6,421,183 B1 | 7/2002 | Ophey | |
| 2001/0028332 A1 | 10/2001 | Roest | |
| 2018/0101020 A1* | 4/2018 | Collier | G02B 27/022 |
| 2018/0180889 A1 | 6/2018 | Lee et al. | |
| 2019/0079234 A1 | 3/2019 | Takagi et al. | |
| 2019/0265493 A1 | 8/2019 | Takagi et al. | |
| 2019/0265494 A1 | 8/2019 | Takagi et al. | |
| 2019/0384070 A1* | 12/2019 | Geng | G02B 5/3025 |
| 2020/0081234 A1* | 3/2020 | Etter | G02B 5/3025 |
| 2020/0132994 A1* | 4/2020 | Niu | H01L 51/5293 |

FOREIGN PATENT DOCUMENTS

| | | |
|---|---|---|
| JP | 2003-504663 A | 2/2003 |
| JP | 2003-529795 A | 10/2003 |
| JP | 2018-106160 A | 7/2018 |
| JP | 2019-053152 A | 4/2019 |
| JP | 2019-148626 A | 9/2019 |
| JP | 2019-148627 A | 9/2019 |

\* cited by examiner

*Primary Examiner* — Phu Vu
(74) *Attorney, Agent, or Firm* — Maier & Maier, PLLC

(57) ABSTRACT

According to one embodiment, a display device including a display panel configured to emit display light of linear polarization, a first retardation plate, a second retardation plate, a reflective polarizer configured to pass first linear polarized light, and to reflect second linear polarized light, a transflective layer including a concave surface opposed to the second retardation plate, and a transparent solid with almost zero refractive anisotropy, wherein the first retardation plate and the second retardation plate are a quarter-wave plate, and the transparent solid includes a first surface shaped convex to be opposed to the concave surface, and a second surface opposed to the reflective polarizer.

19 Claims, 14 Drawing Sheets

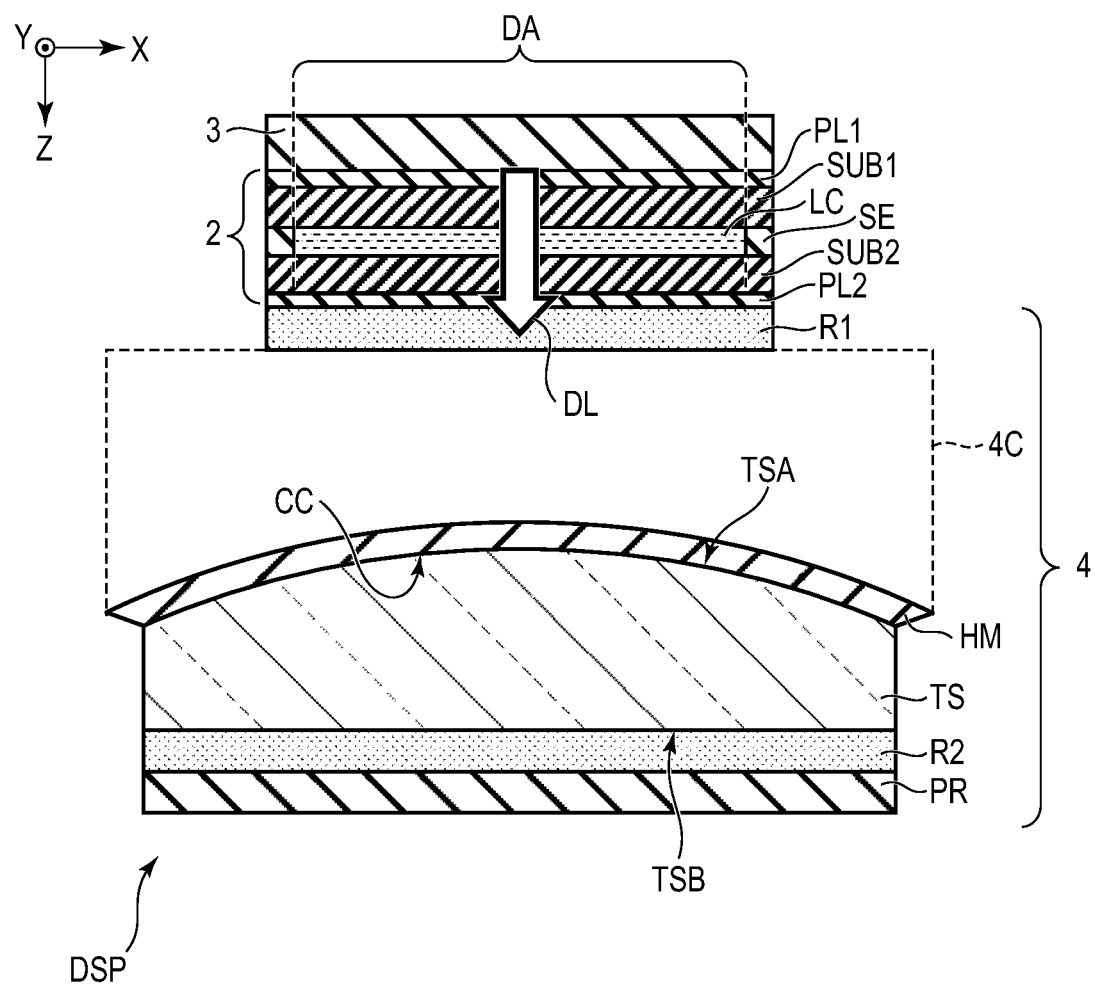
F I G. 3

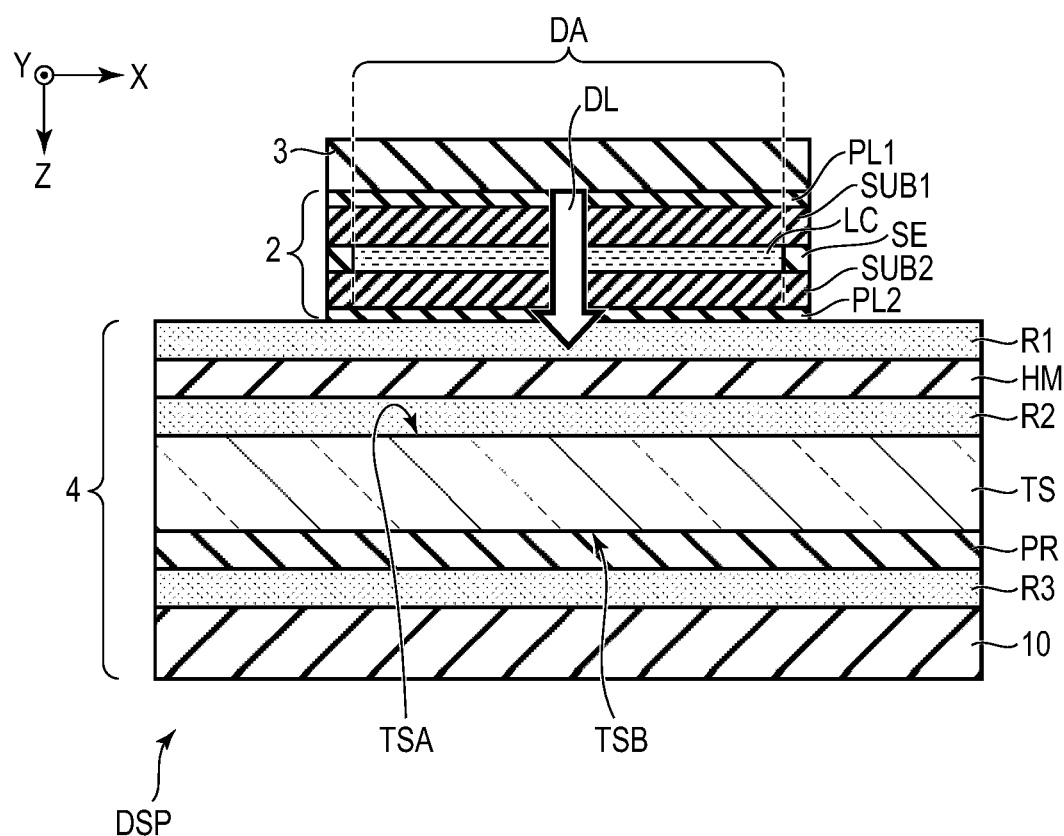
F I G. 5

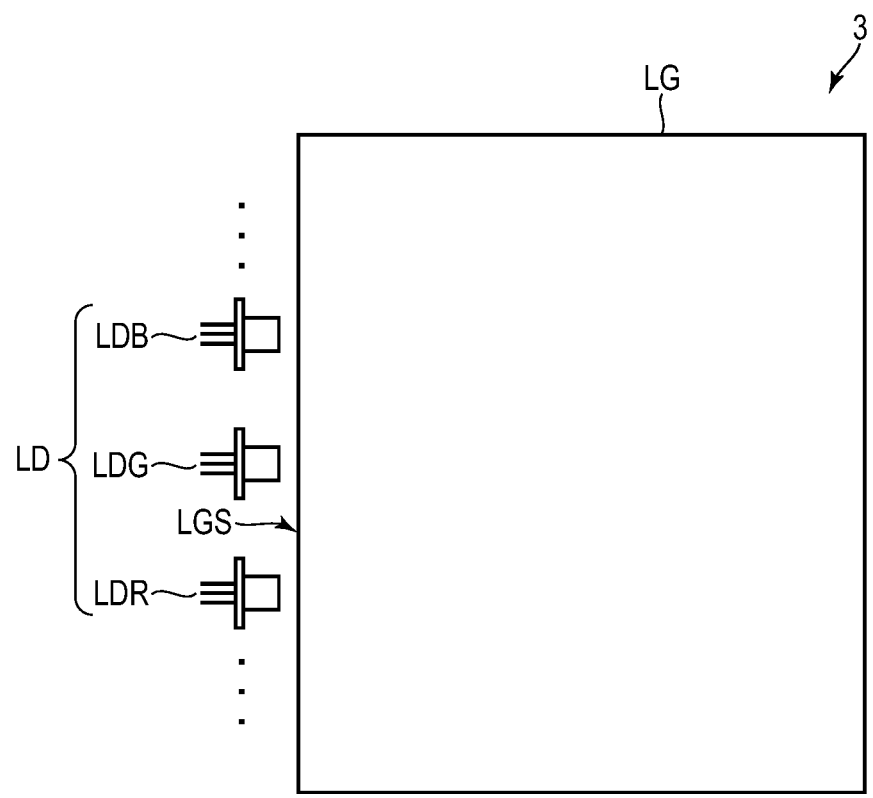
F I G. 11

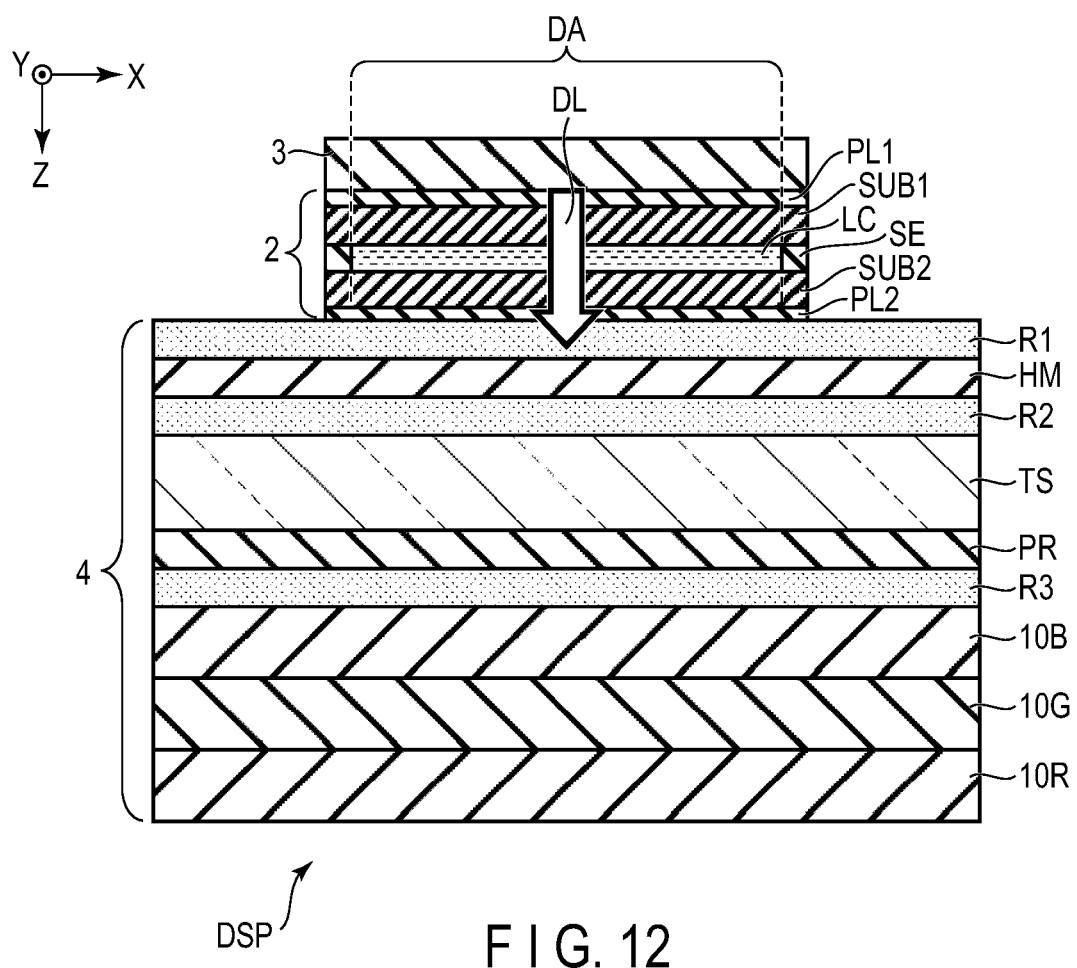
F I G. 12

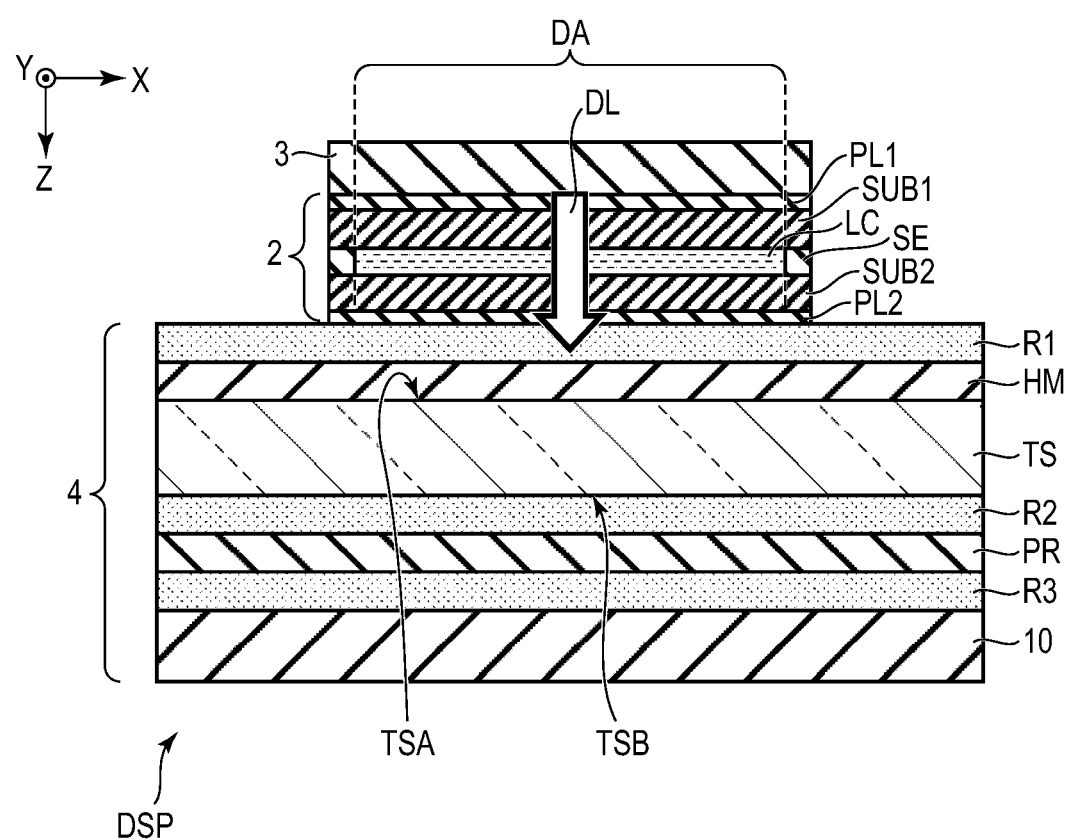
F I G. 14

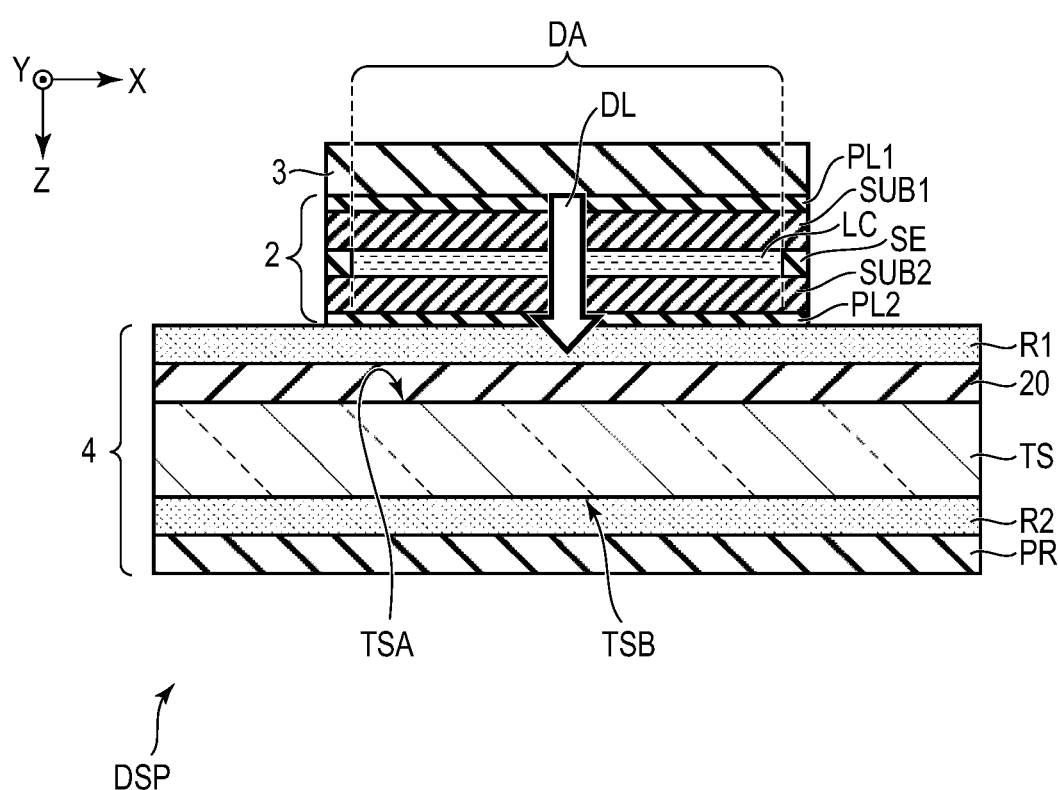
F I G. 15

DISPLAY DEVICE

CROSS-REFERENCE TO RELATED APPLICATIONS

This application is based upon and claims the benefit of priority from Japanese Patent Application No. 2020-171844, filed Oct. 12, 2020, the entire contents of which are incorporated herein by reference.

FIELD

Embodiments described herein relate generally to a display device.

BACKGROUND

In recent years, a technique of presenting a virtual reality (VR) experience and the like in a head mount display attached to the heat of a user is getting attention. A head mount display is structured to display images in a display arranged in front of the eyes of a user. Through such a structure, the user wearing the head mount display can experience a lifelike virtual reality space.

BRIEF DESCRIPTION OF THE DRAWINGS

FIG. 3 is a cross-sectional view of a first structural example of a display device DSP.

FIG. 5 is a cross-sectional view of a second structural example of the display device DSP.

FIG. 11 is a plan view of a structural example of an illumination device 3 which is applicable to the display device DSP of the embodiment.

FIG. 12 is a cross-sectional view of a variant of the display device DSP.

FIG. 14 is a cross-sectional view of a variant of the display device DSP.

FIG. 15 is a cross-sectional view of a variant of the display device DSP.

DETAILED DESCRIPTION

Figure 1:
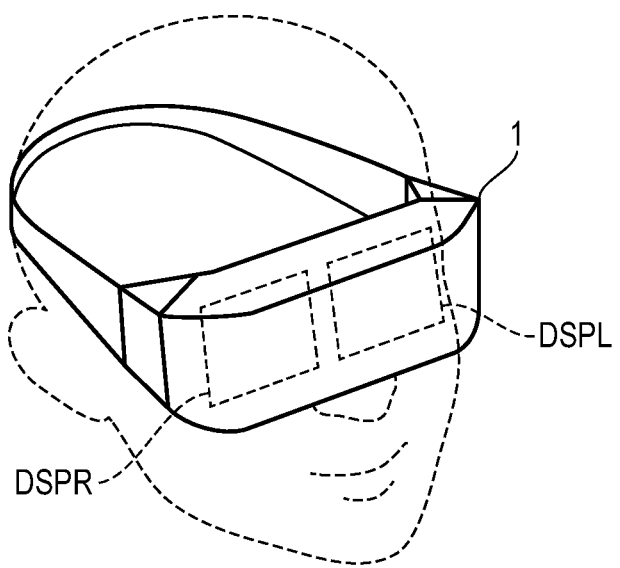
FIG. 1 is a perspective view of an example of the exterior of a head mount display 1 with a display device of an embodiment.

In general, according to one embodiment, a display device includes: a display panel configured to emit display light of linear polarization; a first retardation plate opposed to the display panel; a second retardation plate apart from the first retardation plate; a reflective polarizer configured to pass first linear polarized light, and to reflect second linear polarized light which is orthogonal to the first linear polarized light; a transflective layer disposed between the first retardation plate and the second retardation plate to be apart from the second retardation plate, and including a concave surface opposed to the second retardation plate; and a transparent solid disposed between the transflective layer and the reflective polarizer, with almost zero refractive anisotropy, wherein the first retardation plate and the second retardation plate are a quarter-wave plate, and the transparent solid includes a first surface shaped convex to be opposed to the concave surface, and a second surface opposed to the reflective polarizer.

According to an embodiment, a display device includes: a display panel configured to emit display light of linear polarization; a first retardation plate opposed to the display panel; a transflective layer contacting the first retardation plate; a second retardation plate; a reflective polarizer configured to pass first linear polarized light and to reflect second linear polarized light which is orthogonal to the first linear polarized light; an element with a lens effect to collect first circularly polarized light; a third retardation plate disposed between the reflective polarizer and the element; and a transparent solid disposed between the transflective layer and the reflective polarizer, with almost zero refractive anisotropy, wherein the first, second, and third retardation plates are a quarter-wave plate, and the transparent solid includes a first surface opposed to the transflective layer and a second surface opposed to the reflective polarizer.

According to an embodiment, a display device includes: a display panel configured to emit display light of linear polarization; a first retardation plate opposed to the display panel; a holographic optical element contacting the first retardation plate; a second retardation plate; a reflective polarizer configured to pass first linear polarized light, and to reflect second linear polarized light which is orthogonal to the first linear polarized light; and a transparent solid disposed between the holographic optical element and the reflective polarizer, with almost zero refractive anisotropy, wherein the first retardation plate and the second retardation plate are a quarter-wave plate, and the transparent solid includes a first surface opposed to the holographic optical element and a second surface opposed to the reflective polarizer.

Embodiments will be described hereinafter with reference to the accompanying drawings. The disclosure is merely an example, and proper changes within the spirit of the invention, which are easily conceivable by a skilled person, are included in the scope of the invention as a matter of course. In some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In the specification and drawings, the same elements as those described in connection with preceding drawings are denoted by like reference numerals, and a detailed description thereof is omitted unless otherwise necessary.

Note that, for better understanding of the figures, axes X, Y, and Z which are orthogonal to each other will be drawn therein. A direction along axis X will be referred to as first direction X, a direction along axis Y will be referred to as second direction Y, and a direction along axis Z will be referred to as third direction Z. A plan defined by the axes X and Y will be referred to as X-Y plan, and seeing the X-Y plan will be referred to as plan view.

FIG. 1 is a perspective view of an example of the exterior of a head mount display 1 with a display device of an embodiment. The head mount display 1 includes, for example, a right eye display device DSPR and a left eye display device DSPL. When a user wears the head mount display 1, the display device DSPR is arranged to be positioned in front of the right eye of user, and the display device DSPL is arranged to be positioned in front of the left eye of user.

Figure 2:
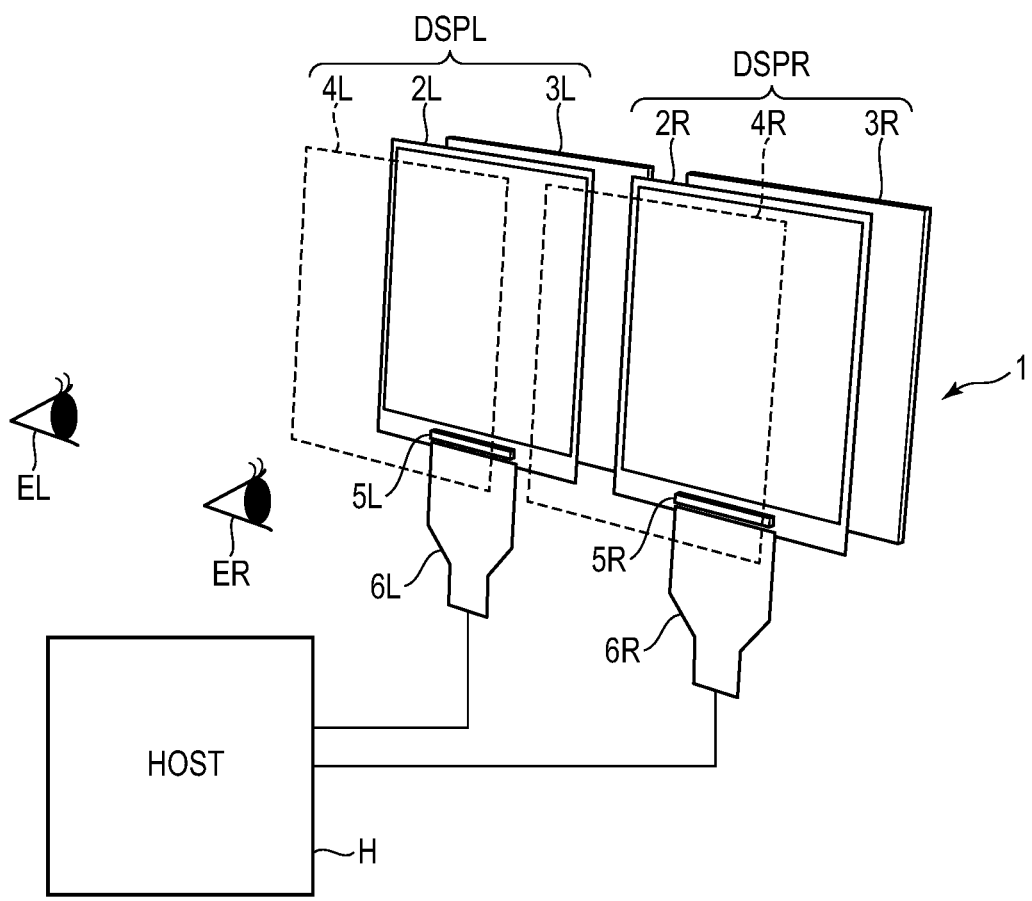
FIG. 2 is a diagram illustrating an outline of the structure of the head mount display 1 of FIG. 1.

FIG. 2 is a diagram illustrating an outline of the structure of the head mount display 1 of FIG. 1. The display device DSPR and the display device DSPL are structured substantially the same.

The display device DSPR includes a display panel 2R, illumination device 3R, and optical system 4R depicted in a dotted line. The illumination device 3R is positioned in the rear surface of the display panel 2R to illuminate the display panel 2R. The optical system 4R is positioned in the front surface of the display panel 2R (or, between the right eye ER of the user and the display panel 2R) to guide the display light from the display panel 2R to the right eye ER.

The display panel 2R is, for example, a liquid crystal panel. The display panel 2R is disposed between the illumination device 3R and the optical system 4R. To the display panel 2R, a driver IC chip 5R and a flexible printed circuit 6R are connected, for example. The driver IC chip 5R controls the drive of the display panel 2R (specifically, the display operation of the display panel 2R).

The display device DSPL includes a display panel 2L, illumination device 3L, and optical system 4L depicted in a dotted line. The illumination device 3L is positioned in the rear surface of the display panel 2L to illumination the display panel 2L. The optical system 4L is positioned in the front surface of the display panel 2L (or, between the left eye EL of the user and the display panel 2L) to guide the display light from the display panel 2L to the left eye EL.

The display panel 2L is, for example, a liquid crystal panel. The display panel 2L is disposed between the illumination device 3L and the optical system 4L. To the display panel 2L, a driver IC chip 5L and a flexible printed circuit 6L are connected, for example. The driver IC chip 5L controls the drive of the display panel 2L (specifically, the display operation of the display panel 2L).

The display panel 2R, illumination device 3R, and optical system 4R of the display device DSPR are structured similarly to the display panel 2L, illumination device 3L, and optical system 4L of the display device DSPL.

In the display device DSP of the present embodiment, the display panels 2R and 2L may not be a liquid crystal panel, but may be a display panel including a spontaneous light emitting element such as organic electroluminescent (EL) element, micro LED, and mini LED. If the display panels 2R and 2L are the display panels including light emitting elements, the illumination devices 3R and 3L will be omitted.

An external host computer H is connected to the display panels 2L and 2R, respectively. The host computer H outputs image data corresponding to images displayed on the display panel 2L and 2R. The image displayed on the display panel 2L is an image for the left eye (or, image recognized by the left eye EL of user). Furthermore, the image displayed on the display panel 2R is an image for the right eye (or, image recognized by the right eye ER of user).

For example, if the head mount display 1 is used for VR, the image for the left eye and the image for the right eye are similar images recreating parallax of the both eyes. When the image for the left eye displayed on the display panel 2L is recognized by the left eye E of user, and the image for the right eye displayed on the display panel 2R is recognized by the right eye ER of user, the user can grasp a stereoscopic space (three-dimensional space) as a virtual reality space.

Now, a first structural example of the display device DSP of the embodiment will be explained.

(First Structural Example)

FIG. 3 is a cross-sectional view of the first structural example of the display device DSP.

The display device DSP includes a display panel 2 and an optical system 4. The display device DSP explained here can be applied to each of the above-described display devices DSPR and DSPL. Furthermore, the display panel 2 can be applied to each of the above-described display panels 2R and 2L. Furthermore, the optical system 4 can be applied to each of the above-described optical system 4R and 4L.

The display panel 2 is formed in a flat panel extending along the X-Y plan. The display panel 2 includes a first substrate SUB1, second substrate SUB2, liquid crystal layer LC, first polarizer PL1, and second polarizer PL2. The liquid crystal layer LC is held between the first substrate SUB1 and the second substrate SUB2, and is sealed with a sealant SE. The first polarizer PL1 is disposed between an illumination device 3 and the first substrate SUB1. The second polarizer PL2 is disposed between the second substrate SUB2 and an optical system 4.

The display panel 2 includes a display area DA configured to emit display light DL of linear polarization. The display area DA is configured to selectively modulate the illumination light from the illumination device 3. The illumination light partially passes the second polarizer PL2 to be converted into the display light DL of linear polarization.

Not only in the first structural example explained here but also in other structural examples, the display panel 2 may not be a liquid crystal panel. If the display panel 2 is a display panel including spontaneous light emitting elements, the illumination device 3 will be omitted as mentioned above. Furthermore, in that case, the display light DL emitted from the light emitting element passes the second polarizer PL2 to be converted into the display light DL of linear polarization.

The optical system 4 includes a first retardation plate R1, transflective layer HM, transparent solid TS, second retardation plate R2, and reflective polarizer PR.

The first retardation plate R1 and the second retardation plate R2 are a quarter-wave plate which applies retardation of a quarter-wave to the passing light. The first retardation plate R1 is arranged to be opposed to, at least, the display area DA in the X-Y plan. The first retardation plate R1 contacts the display panel 2. In the example of FIG. 3, the first retardation plate R1 contacts the second polarizer PL2. The second retardation plate R2 is apart from the first retardation plate R1 to be opposed thereto in the third direction Z with a gap therebetween.

The transflective layer HM, transparent solid TS, second retardation plate R2, and reflective polarizer PR are layered in the third direction Z in this order. That is, the transparent solid TS contacts the transflecive layer HM, the second retardation plate R2 contacts the transparent solid TS, and the reflective polarizer PR contacts the second retardation plate R2.

The transflective layer HM is disposed between the first retardation plate R1 and the second retardation plate R2 while being apart from the second retardation plate R2. Furthermore, in the example of FIG. 3, the transflective layer HM is apart from the first retardation plate R1, and in the third direction Z, is opposed to the first retardation plate R1 via an air layer 4C. The transflective layer HM includes a concave surface CC opposed to the second retardation plate R2. The transflective layer HM passes a part of the incident light and reflects the other light.

For example, the transflective layer HM is a thin film formed of a metal material such as aluminum or silver. The transflective layer may be formed on, for example, the surface of a transparent base material including a concave surface CC, or may be formed in a first surface TSA of the transparent solid TS, which will be described later. The transmissivity of the transflective layer HM is approximately 50%.

The reflective polarizer PR is configured to pass first linear polarized light of the incident light, and to reflect second linear polarized light which is orthogonal to the first linear polarized light. For example, the reflective polarizer PR may be a multilayered thin film type, or may be a wire grid type.

The transparent solid TS is disposed between the transflective layer HM and the reflective polarizer PR, and includes a first surface TSA opposed to the transflective layer HM and a second surface TSB opposed to the reflective polarizer PR. In the example of FIG. 3, the second retardation plate R2 contacts the reflective polarizer PR, and the transparent solid TS is disposed between the transflective layer HM and the second retardation plate R2. The transparent solid TS includes a first surface TSA which is convex and contacts the concave surface CC of the transflective layer HM, and a second surface TSB which is flat and contacts the second retardation plate R2. That is, the transparent solid TS is charged in the space between the transflective layer HM and the second retardation plate R2. The maximum thickness of the transparent solid TS in the third direction Z is 1 to 10 mm, and in this example, is approximately 5 mm.

The transparent solid TS is formed of a transparent medium having almost zero refractive anisotropy. That is, the transparent solid TS has an isotropic refractive index. That is, in the transparent solid TS, alignment birefringence by extension alignment is almost zero, and optical birefringence by stress deformation is almost zero.

The refractive index of the transparent solid TS is greater than the refractive index of air, and is substantially equal to the refractive index of the second retardation plate R2. For example, a difference between the refractive index of the transparent solid TS and a fluorescent refractive index no of the second retardation plate R2, or a difference between the refractive index of the transparent solid TS and an extraordinary refractive index ne is below 0.1.

For example, the transparent solid TS is formed of a polymer. Furthermore, the transparent solid TS is formed as a copolymer obtained by copolymerization of a plurality of monomers. Note that, the transparent solid TS may be formed of a glass; however, it is preferably formed of a polymer in consideration of light-weight, and easy-treatment characteristics.

The transflective layer HM, transparent solid TS, second retardation plate, and reflective polarizer PR extend over a range which is greater than the display area DA in the X-Y plan. That is, both the first surface TSA and the second surface TSB of the transparent solid TS extend over a range greater than the display area DA.

The display panel 2 (or, second polarizer PL2) and the first retardation plate R1, preferably, contact each other without an air layer interposed therebetween. Furthermore, the transflective layer HM, transparent solid TS, second retardation plate R2, and reflective polarizer PR, preferably, contact each other without an air layer interposed therebetween. Thus, undesired refraction or reflection on the interfaces between the components can be suppressed.

The first retardation plate R1 and the second retardation plate R2 are configured to apply, for example, quarter-wave retardation to at least green wave light; however, no limitation is intended thereby. For example, as the first retardation plate R1 and the second retardation plate R2, a broadband retardation plate which applies substantially quarter-wave retardation with respect to each light of red, green, and blue wavelengths can be used. Such a broadband retardation plate is formed by, for example, adhering a quarter-wave plate and a half-wave plate such that a slow axis of the quarter-wave plate and a slow axis of the half-wave plate form a certain angle. Thus, wavelength dependency in the first retardation plate R1 and the second retardation plate R2 can be reduced.

Figure 4:
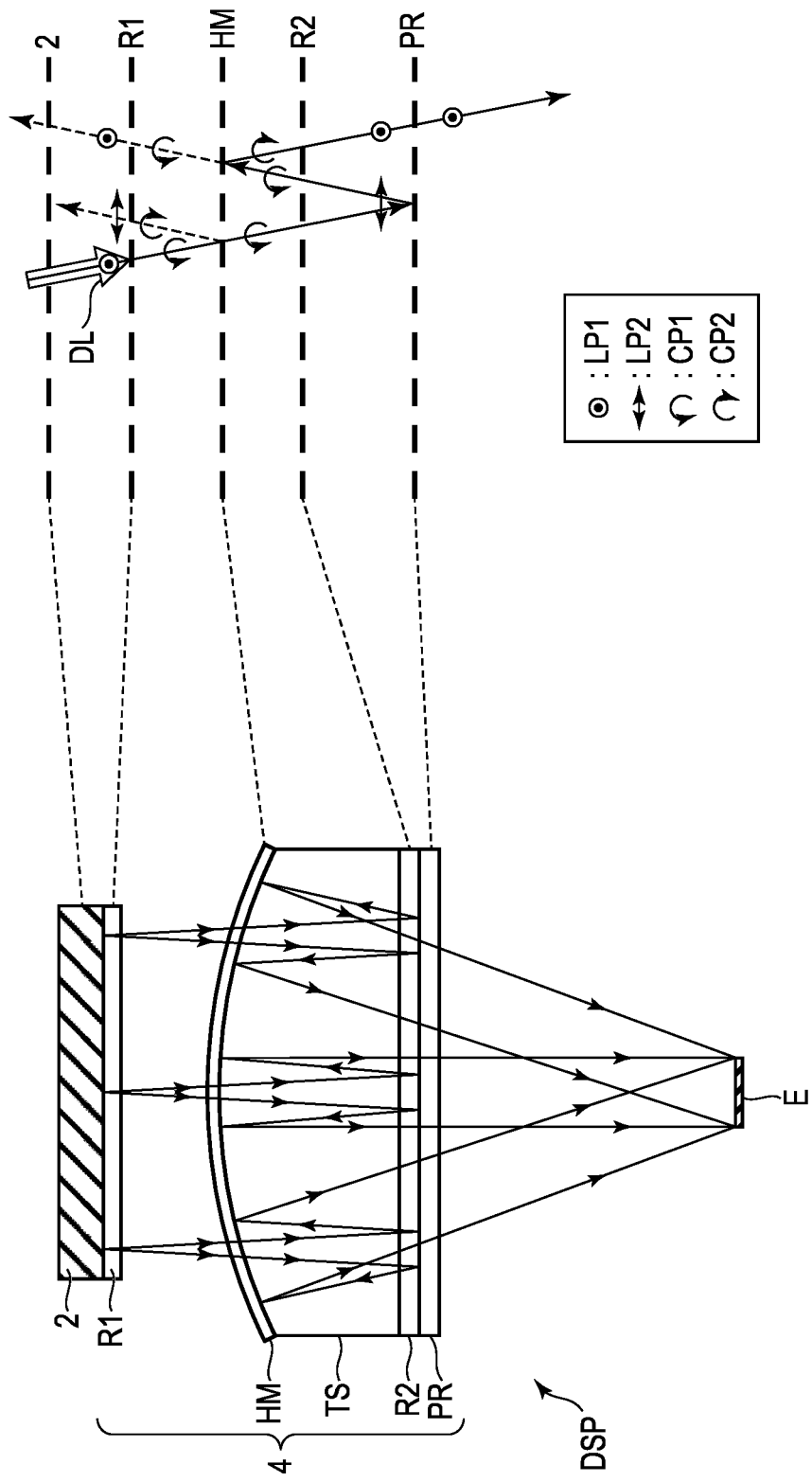
FIG. 4 illustrates an optical effect of the display device DSP.

FIG. 4 illustrates an optical effect of the display device DSP.

Firstly, the display panel 2 emits display light DL of first linear polarized light LP1. The first linear polarized light LP1 in this example is, for example, linear polarization light which oscillates vertically with respect to a paper surface. When the display light DL passes the first retardation plate R1, quarter-wave retardation is applied thereto. Thus, after passing the first retardation plate R1, the display light DL is converted into first circularly polarized light CP1. In this example, the first circularly polarized light CP1 is, for example, counterclockwise circularly polarized light.

After passing the first retardation plate R1, a part of the first circularly polarized light CP1 passes the transflective layer HM, and the other first circularly polarized light CP1 is reflected by the transflective layer HM. The first circularly polarized light CP1 passing the transflective layer HM passes the transparent solid TS. Since the transparent solid TS does not have birefringence as described above, the polarization state of the first circularly polarized light CP1 is maintained while passing the transparent solid TS.

When the first circularly polarized light CP1 which has passed the transparent solid TS passes the second retardation plate R2, quarter-wave retardation is applied thereto, and the first circularly polarized light CP1 is converted into the second linear polarized light LP2. In this example, the second linear polarized light LP2 is linear polarization light which oscillates in a direction orthogonal to the first linear polarized light LP1, that is, in a direction parallel to the paper surface.

Note that, when the first circularly polarized light CP1 is reflected by the transflective layer HM, it is converted into second circularly polarized light CP2 which is opposite to the first circularly polarized light CP1. In this example, the second circularly polarized light CP2 is, for example, clockwise circularly polarized light. The second circularly polarized light CP2 reflected by the transflective layer HM passes the first retardation plate R1 to be converted into the second linear polarized light LP2, and is absorbed by the display panel 2.

The second linear polarized light LP2 which has passed the second retardation plate R2 is reflected by the reflective polarizer PR. The second linear polarized light LP2 reflected by the reflective polarizer PR passes the second retardation plate R2 to be converted into the first circularly polarized light CP1. The first circularly polarized light CP1 which has passed the second retardation plate R2 passes the transparent solid TS while the polarization state thereof is maintained.

When passing the transparent solid TS, a part of the first circularly polarized light CP1 is reflected by the transflective layer HM, and the other first circularly polarized light CP1 passes the transflective layer HM. When the first circularly polarized light CP1 is reflected by the transflective layer HM, it is converted into the second circularly polarized light CP2. The second circularly polarized light CP2 reflected by the transflective layer HM passes the transparent solid TS, and then, passes the second retardation plate R2 to be converted into the first linear polarized light LP1.

Note that, the first circularly polarized light CP1 which has passed the transflective layer HM passes the first retardation plate R1 to be converted into the first linear polarized light LP1.

The first linear polarized light LP1 which has passed the second retardation plate R2 passes the reflective polarizer PR. The passing light of the reflective polarizer PR is reflection light from the transflective layer HM, and is focused onto eyes E of a user by an effect of a concave mirror.

In the display device DSP as described above, the optical system 4 has a light path passing between the transflective layer HM and the reflective polarizer PR for three times. That is, an optical distance between the transflective layer HM and the reflective polarizer PR is approximately three times the actual gap between the transflective layer HM and the reflective polarizer PR (or thickness of the transparent solid TS). Since the transflective layer HM includes the concave surface CC which is a reflective surface, the reflection light of the transflective layer HM is focused onto the eyes E of a user. Thus, the user can observe a virtual image in an enlarged manner.

If the transparent solid TS of FIG. 4 is replaced with an air layer, undesired reflection light at the interface between the second retardation plate R2 and the air layer may cause duplicated images (i.e. ghosts) which will deteriorate the display quality. In contrast, in the first structural example, the second retardation plate R2 and the transparent solid TS contact closely while the second retardation plate R2 and the transparent solid TS have substantially the same refractive index. Thus, undesired reflection light does not occur, and the deterioration of the display quality can be suppressed.

Furthermore, since the transparent solid TS has almost zero refractive anisotropy, the polarization state of the light passing the transparent solid TS is maintained. Thus, the deterioration of the display quality can be suppressed, and decrease of light usage can be suppressed.

Furthermore, since the wavelength dependency of each component of the optical system 4 is small, the structure of the optical system 4 can be simplified, and a color image displayed in the display area DA can be efficiently focused on the eyes E of a user.

Note that the first linear polarized light LP1 explained above with reference to FIG. 4 may be replaced with the second linear polarized light LP2, or the first circularly polarized light CP1 may be replaced with the second circularly polarized light CP2.

Now, a second structural example of the display device DSP of the present embodiment will be explained. Note that, in the following description, the elements of the second structural example which are the same as those of the first structural example may be referred to by the same reference numbers and the explanation thereof will be omitted.

(Second Structural Example)

FIG. 5 is a cross-sectional view of the second structural example of the display device DSP. The second structural example of FIG. 5 is different from the first structural example of FIG. 3 in respect of the structure of the optical system 4.

That is, the display device DSP includes a display panel 2 and an optical system 4. The details of the display panel 2 will not be explained here; however, it is configured to emit display light DL of linear polarization in the display area DA.

The optical system 4 includes a first retardation plate R1, transflective layer HM, second retardation plate R2, transparent solid TS, reflective polarizer PR, third retardation plate R3, and liquid crystal element 10. The first retardation plate R1, second retardation plate R2, and third retardation plate R3 are a quarter-wave plate which applies quarter-wave retardation to passing light. Note that, the first retardation plate R1, second retardation plate R2, and third retardation plate R3 of the second structural example may be a broadband retardation plate, as with the first retardation plate R1 and the like of the first structural example.

The transflective layer HM passes a part of the incident light, and reflects the other part thereof. The transflective layer HM of the second structural example is formed in a flat panel shape along the X-Y plan. The transparent solid TS has almost zero refractive anisotropy, and the details thereof is the same as that of the first structural example explained above.

The reflective polarizer PR is configured to pass first linear polarized light of the incident light and to reflect second linear polarized light which is orthogonal to the first linear polarized light. The liquid crystal element 10 applies half-wave retardation to light of specific wavelength, and has a lens effect to focus the first circularly polarized light. Note that, in this example, the liquid crystal element 10 is cited as an example of an element with a lens effect to focus the circularly polarized light; however, an element with a similar lens effect can be used instead of such liquid crystal element.

The first retardation plate R1, transflective layer HM, second retardation plate R2, transparent solid TS, reflective polarizer PR, third retardation plate R3, and liquid crystal element 10 extend over a range which is greater than the display area DA in the X-Y plan. Furthermore, the first retardation plate R1, transflective layer HM, second retardation plate R2, transparent solid TS, reflective polarizer PR, third retardation plate R3, and liquid crystal element 10 are layered in the third direction Z in this order.

That is, the first retardation plate R1 contacts the display panel 2 (or second polarizer PL2), the transflective layer HM contacts the first retardation plate R1, the second retardation plate R2 contacts the transflective layer HM, and the transflective layer HM is positioned between the first retardation plate R1 and the second retardation plate R2. Furthermore, the third retardation plate R3 contacts the reflective polarizer PR, the liquid crystal element 10 contacts the third retardation plate R3, and the third retardation plate R3 is positioned between the reflective polarizer PR an the liquid crystal element 10.

The transparent solid TS is disposed between the transflective layer HM and the reflective polarizer PR, and has a first surface TSA opposed to the transflective layer HM and a second surface TSB opposed to the reflective polarizer PR. In the example of FIG. 5, the second retardation plate R2 contacts the transflective layer HM, and the transparent solid TS is disposed between the second retardation plate R2 and the reflective polarizer PR, and has a first surface TSA which is flat and contacts the second retardation plate R2 and a second surface TSB which is flat and contacts the reflective polarizer PR. The first surface TSA and the second surface TSB of the transparent solid TS each extend over a range which is greater than the display area DA.

Figure 6:
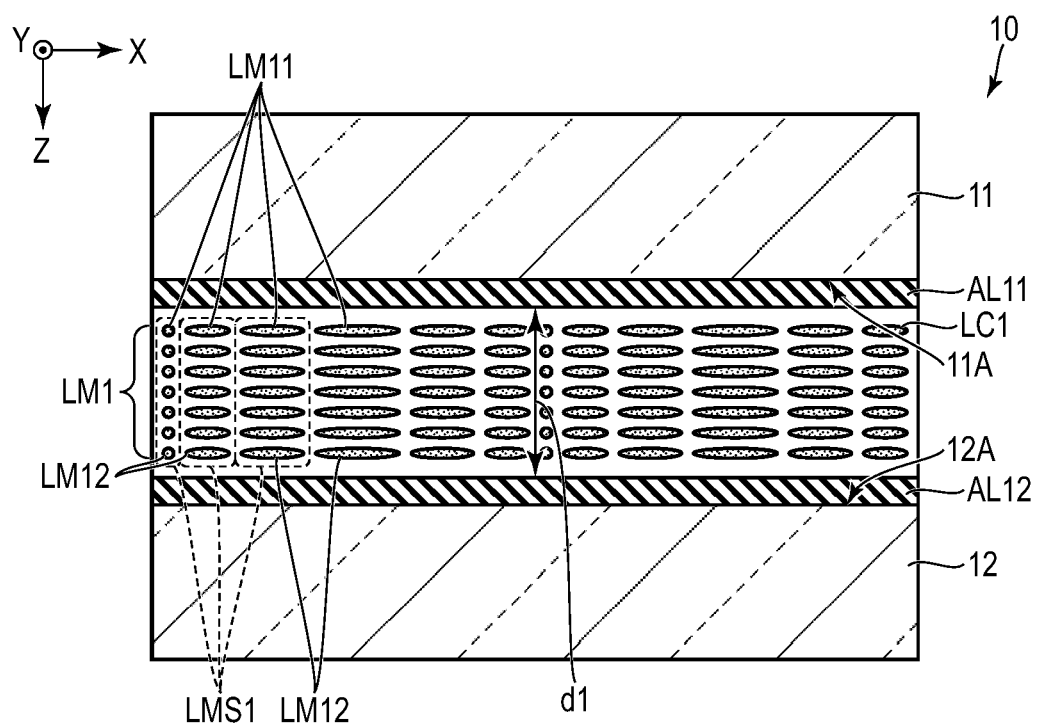
FIG. 6 is a cross-sectional view of an example of a liquid crystal element 10 of FIG. 5.

FIG. 6 is a cross-sectional view of an example of the liquid crystal element 10 of FIG. 5. The liquid crystal element 10 includes a substrate 11, alignment film AL11, liquid crystal layer (first liquid crystal layer) LC1, alignment film AL12, and substrate 12.

The substrates 11 and 12 are a transparent substrate which passes the light, which is formed of a transparent glass plate or a transparent synthetic resin plate. The substrate 11 is, for example, adhered to the third retardation plate R3 which is illustrated in FIG. 5, but may be replaced with the third retardation plate R3.

The alignment film AL11 is disposed in the inner surface 11A of the substrate 11. In the example of FIG. 6, the alignment film AL11 contacts the substrate 11; however, another thin film may be interposed between the alignment film AL11 and the substrate 11.

The alignment film AL12 is disposed in the inner surface 12A of the substrate 12. In the example of FIG. 6, the alignment film AL12 contacts the substrate 12; however, another thin film may be interposed between the alignment film AL12 and the substrate 12. The alignment film AL12 is opposed to the alignment film AL11 in the third direction Z.

The alignment films AL11 and AL12 are formed of a polyimide, for example, and are a horizontal alignment film having an alignment restriction force along the X-Y plan.

The liquid crystal layer LC1 is disposed between the alignment films AL11 and AL12 while contacting the alignment films AL11 and AL12. The liquid crystal layer LC1 has a thickness d1 in the third direction Z. The liquid crystal layer LC1 includes nematic liquid crystals alignment directions of which are in the third direction Z.

That is, the liquid crystal layer LC1 includes a plurality of liquid crystal structures LMS1. Focusing on one liquid crystal structure LMS1, the liquid crystal structure LMS1 includes liquid crystal molecules LM11 in one end and liquid crystal molecules LM12 in the other side. The liquid crystal molecules LM11 are close to the alignment film AL11 and the liquid crystal molecules LM12 are close to the alignment film AL12. The alignment direction of the liquid crystal molecules LM11 and the alignment direction of the liquid crystal molecules LM12 are substantially the same. Furthermore, the alignment direction of the other liquid crystal molecules LM1 between the liquid crystal molecules LM11 and LM12 and the alignment direction of the liquid crystal molecules LM11 are substantially the same. Note that the alignment direction of the liquid crystal molecules LM1 corresponds to the orientation of the long axes of the liquid crystal molecules in the X-Y plan.

Furthermore, in the liquid crystal layer LC1, a plurality of liquid crystal structures LMS1 adjacent to each other in the first direction X have different alignment directions. Similarly, a plurality of liquid crystal structures LMS1 adjacent to each other in the second direction Y have different alignment directions. The alignment directions of the liquid crystal molecules LM11 arranged along the alignment film AL11, and the alignment directions of the liquid crystal molecules LM12 arranged along the alignment film LM12 change continuously (or linearly).

The liquid crystal layer LC1 as above is cured while the alignment directions of the liquid crystal molecules LM1 including the liquid crystal molecules LM11 and LM12 are fixed. That is, the alignment directions of the liquid crystal molecules LM1 are not controlled according to the electric field. Thus, the liquid crystal element 10 does not include electrodes for alignment control.

When the refractive anisotropy or the birefringence of the liquid crystal layer LC1 (a difference between the refractive index ne with respect to the extraordinary light of the liquid crystal layer LC1 and the refractive index no with respect to the ordinary light) is $\Delta n$, the retardation $\Delta n \cdot d1$ is set to half the specific wavelength $\lambda$.

Figure 7:
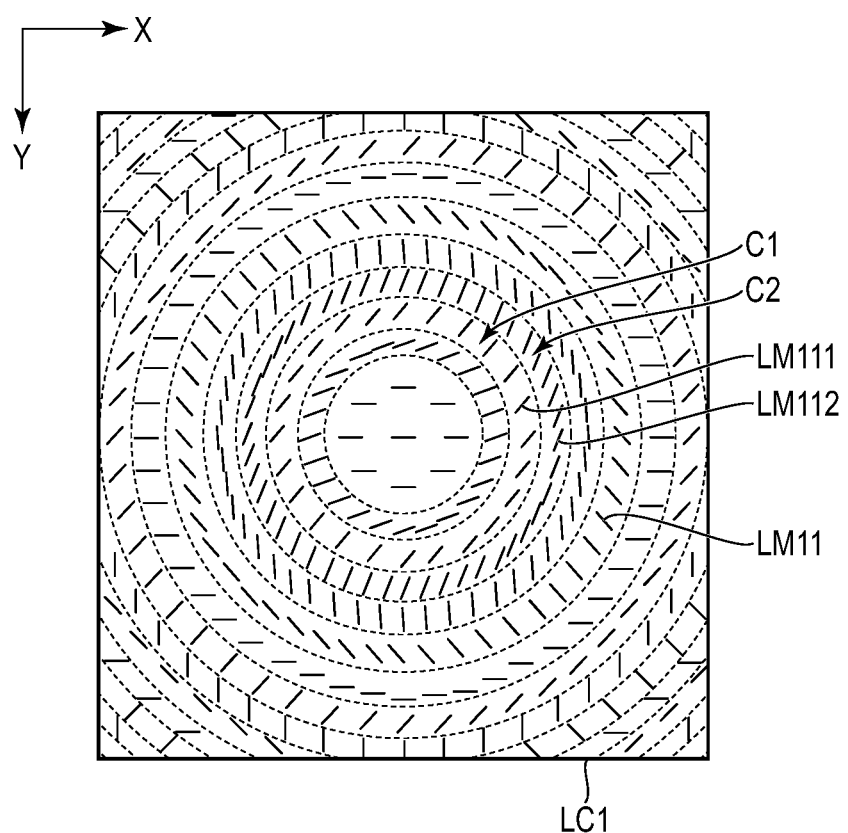
FIG. 7 is a plan view of an example of an alignment pattern of a liquid crystal layer LC1 of FIG. 6.

FIG. 7 is a plan view illustrating an example of the alignment pattern of the liquid crystal layer LC1 of FIG. 6. FIG. 7 illustrates an example of phases in the X-Y plan of the liquid crystal layer LC1. The phases illustrated in this example are alignment directions of the liquid crystal molecules LM11 close to the alignment film AL11 out of the liquid crystal molecules included in the liquid crystal structures LMS1.

In the concentric circles depicted in the dotted lines in the figure have the same phases. Or, in the ring-shaped area surrounded by two concentric circles adjacent to each other have the same alignment direction of the liquid crystal molecules LM11. Note that the alignment directions of the liquid crystal molecules LM11 in the ring-shaped areas adjacent to each other are difference from each other.

For example, the liquid crystal layer LC1 includes, in a plan view, a first ring-shaped area C1 and a second ring-shaped area C2. The first ring-shaped area C1 is formed of the first liquid crystal molecules LM111 aligned in the same direction. Furthermore, the second ring-shaped area C2 is formed of the second liquid crystal molecules LM112 aligned in the same direction. The alignment direction of the first liquid crystal molecules LM111 and the alignment direction of the second liquid crystal molecules LM112 are different.

Similarly, the alignment directions of the liquid crystal molecules LM11 arranged in the radius direction from the center of the concentric circles are different from each other and change continuously. That is, in the X-Y plan illustrated in the figure, the shapes of the liquid crystal layer LC1 are different in the radius direction and change continuously.

When the first circularly polarized light is incident on the liquid crystal element 10 structured as above, the first circularly polarized light is focused toward the center of the concentric circles, and the light passing the liquid crystal element 10 is converted into the second circularly polarized light which is opposite to the first circularly polarized light.

Figure 8:
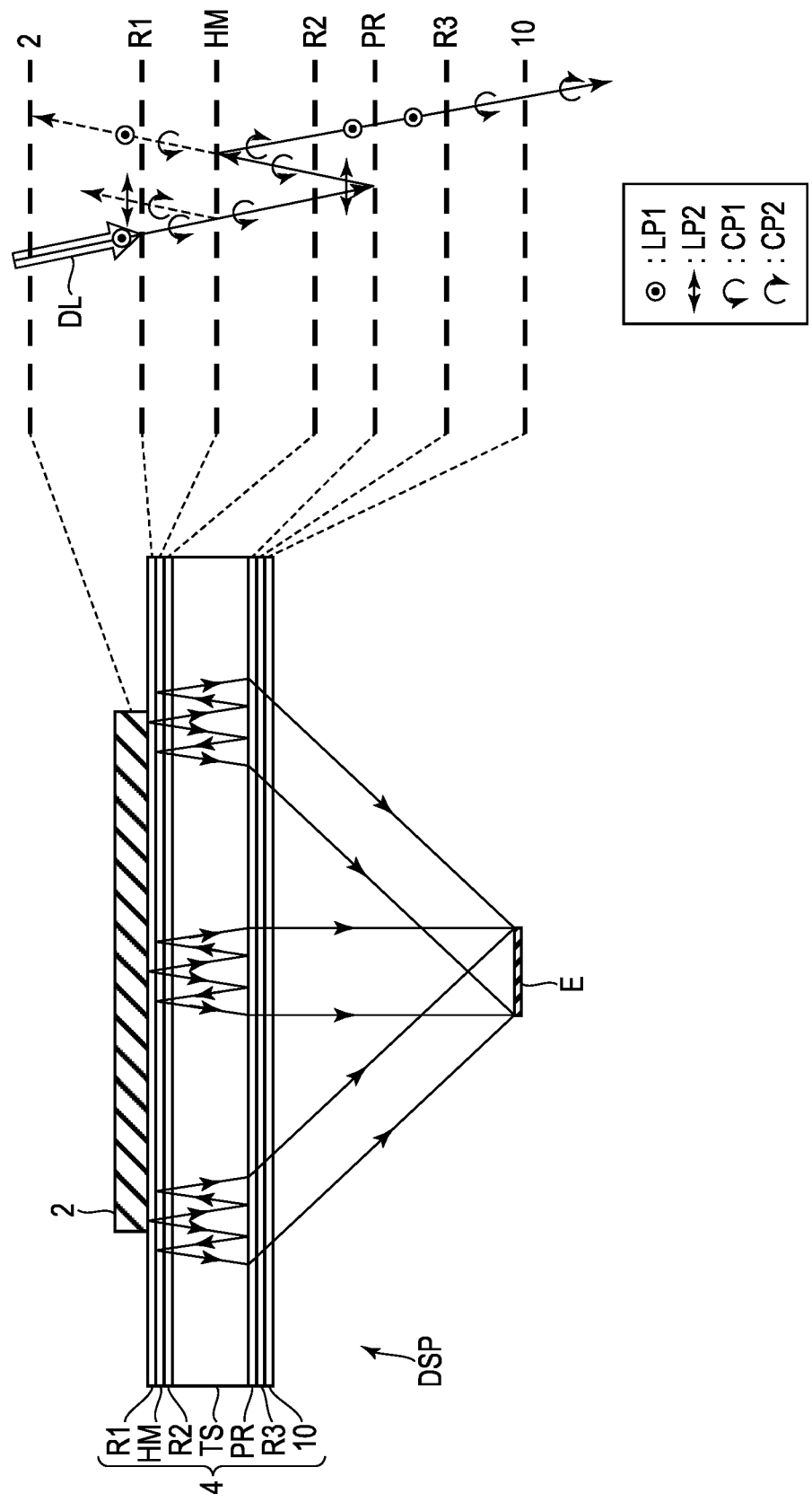
FIG. 8 illustrates an optical effect of the display device DSP.

FIG. 8 is a diagram illustrating an optical effect of the display device DSP.

Initially, the display panel 2 emits the display light DL of first linear polarized light LP1. The display light DL in this example is the light of specific wavelength $\lambda$. The display light DL passes the first retardation plate R1 to be converted into the first circularly polarized light CP1.

The first circularly polarized light CP1 which has passed the first retardation plate R1 partly passes the transflective layer HM while the other part thereof is reflected by the transflective layer HM. The first circularly polarized light CP1 which has passed the transflective layer HM passes the second retardation plate R2 to be converted into the second linear polarized light LP2.

Note that, when the first circularly polarized light CP1 is reflected by the transflective layer HM, the reflected light is converted into the second circularly polarized light CP2 which is opposite to the first circularly polarized light CP1. The second circularly polarized light CP2 reflected by the transflective layer HM passes the first retardation plate R1 to be converted into the second linear polarized light LP2, and is absorbed by the display panel 2.

The second linear polarized light LP2 which has passed the second retardation plate R2 passes the transparent solid TS, and is reflected by the reflective polarizer PR. The second linear polarized light LP2 reflected by the reflective polarizer PR passes the transparent solid TS, and then, passes the second retardation plate R2 to be converted into the first circularly polarized light CP1.

The first circularly polarized light CP1 which has passed the second retardation plate R2 is partly reflected by the transflective layer HM while the other part thereof passes the transflective layer HM. When the first circularly polarized light CP1 is reflected by the transflective layer HM, the reflected light is converted into the second circularly polarized light CP2. The second circularly polarized light CP2 reflected by the transflective layer HM passes the second retardation plate R2 to be converted into the first linear polarized light LP1.

Note that, the first circularly polarized light CP1 which has passed the transflective layer HM passes the first retardation plate R1 to be converted into the first linear polarized light LP1.

The first linear polarized light LP1 which has passes the second retardation plate R2 passes the transparent solid TS, and then, passes the reflective polarizer PR, and the third retardation plate R3 to be converted into the first circularly polarized light CP1. The first circularly polarized light CP1 which has passed the third retardation plate R3 is converted into the second circularly polarized light CP2 in the liquid crystal element 10 and is focused onto the eyes E of a user by a lens effect.

The second structural example described as above can achieve the same advantages of the first structural example described above.

Note that, the first linear polarized light LP1 explained with reference to FIG. 8 may be replaced with the second linear polarized light LP2, or the first circularly polarized light CP1 may be replaced with the second circularly polarized light CP2.

Now, a third structural example of the display device DSP of the present embodiment will be explained.

(Third Structural Example)

Figure 9:
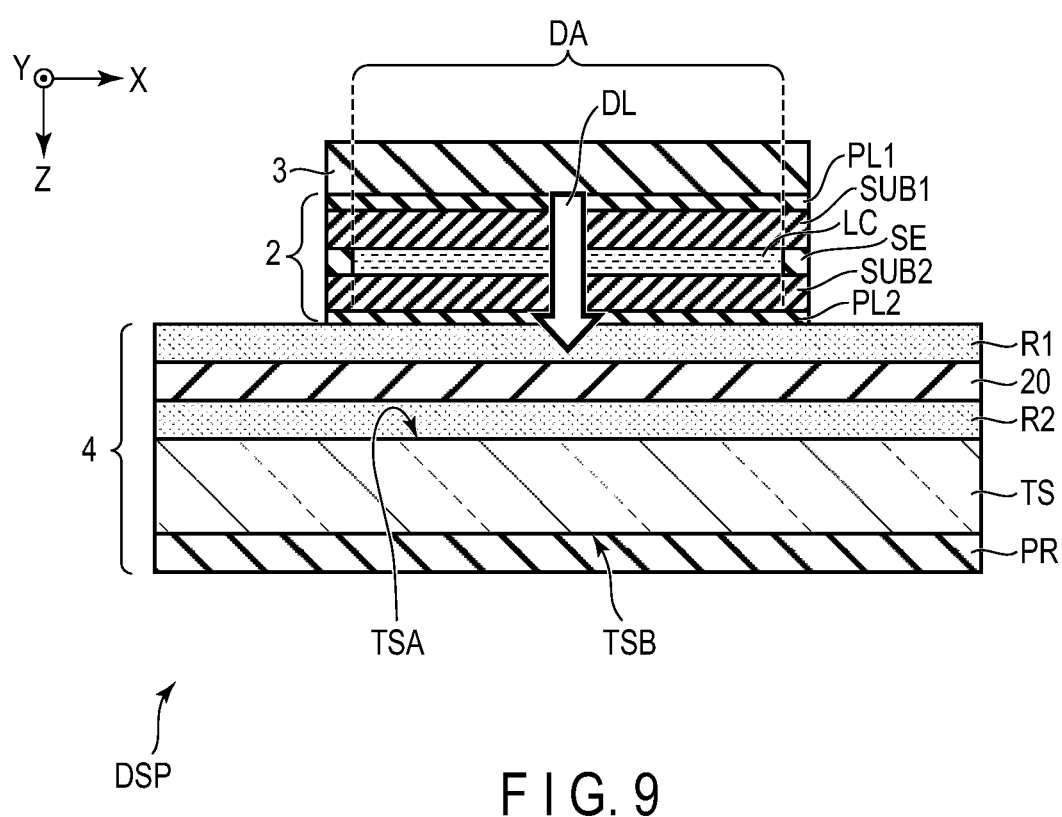
FIG. 9 is a cross-sectional view of the second structural example of the display device DSP.

FIG. 9 is a cross-sectional view of a third structural example of the display device DSP. The third structural example of FIG. 9 is different from the first structural example of FIG. 3 in respect of the structure of the optical system 4.

That is, the display device DSP includes a display panel 2 and an optical system 4. The details of the display panel 2 will not be explained here; however, it is configured to emit display light DL of linear polarization in the display area DA.

The optical system 4 includes a first retardation plate R1, holographic optical element 20, second retardation plate R2, transparent solid TS, and reflective polarizer PR. The first retardation plate R1, and the second retardation plate R2 are a quarter-wave plate which applies quarter-wave retardation to passing light. Note that, the first retardation plate R1, and the second retardation plate R2 of the third structural example may be a broadband retardation plate, as with the first retardation plate R1 and the like of the first structural example.

The holographic optical element 20 is configured to have a lens effect to reflect/diffract a part of the incident light and to condense the light. The holographic optical element 20 has an interference fringe pattern to diffract the incident light to predetermined directions.

The transparent solid TS has almost zero refractive anisotropy, and the details thereof are the same as those in the first structural example explained above. The reflective polarizer PR passes the first linear polarized light of the incident light, and reflects the second linear polarized light which is orthogonal to the first linear polarized light.

The first retardation plate R1, holographic optical element 20, second retardation plate R2, transparent solid TS, and reflective polarizer PR extend over a range which is greater than the display area DA in the X-Y plan. Furthermore, the first retardation plate R1, holographic optical element 20, second retardation plate R2, transparent solid TS, and reflective polarizer PR are layered in the third direction Z in this order.

That is, the first retardation plate R1 contacts the display panel 2 (or second polarizer PL2), the holographic optical element 20 contacts the first retardation plate R1, the second retardation plate R2 contacts the holographic optical element 20, and the holographic optical element 20 is positioned between the first retardation plate R1 and the second retardation plate R2.

The transparent solid TS is disposed between the holographic optical element 20 and the reflective polarizer PR, and has a first surface TSA opposed to the holographic optical element 20 and a second surface TSB opposed to the reflective polarizer PR. In the example of FIG. 8, the second retardation plate R2 contacts the holographic optical element 20, and the transparent solid TS is disposed between the second retardation plate R2 and the reflective polarizer PR, and has a first surface TSA which is flat and contacts the second retardation plate R2 and a second surface TSB which is flat and contacts the reflective polarizer PR. The first surface TSA and the second surface TSB of the transparent solid TS each extend over a range which is greater than the display area DR.

Figure 10:
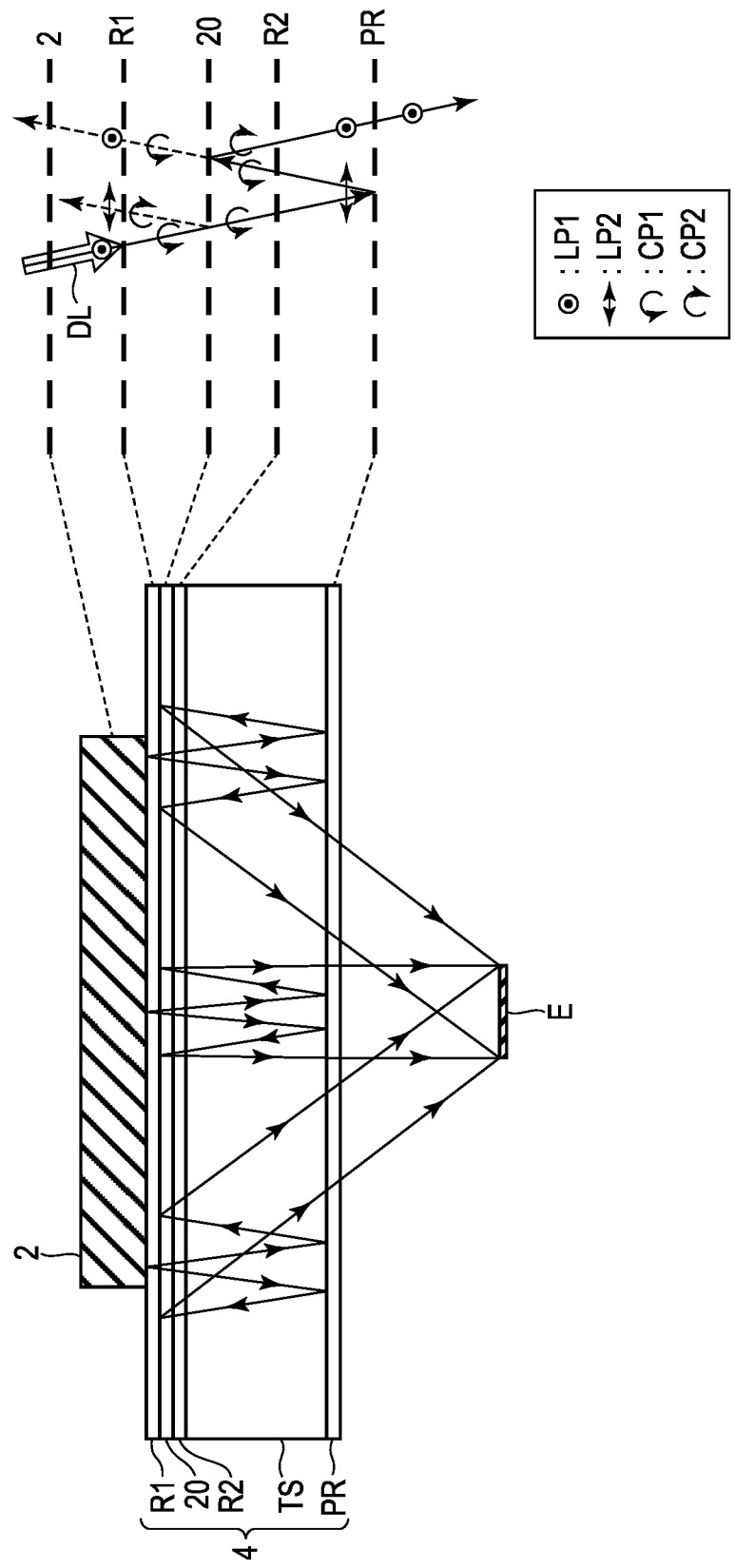
FIG. 10 illustrates an optical effect of the display device DSP.

FIG. 10 is a diagram illustrating an optical effect of the display device DSP.

Initially, the display panel 2 emits the display light DL of first linear polarized light LP1. The display light DL passes the first retardation plate R1 to be converted into the first circularly polarized light CP1.

The first circularly polarized light CP1 which has passed the first retardation plate R1 partly passes the holographic optical element 20 while the other part thereof is reflected by the holographic optical element 20. The first circularly polarized light CP1 which has passed the holographic optical element 20 passes the second retardation plate R2 to be converted into the second linear polarized light LP2.

Note that, when the first circularly polarized light CP1 is reflected by the holographic optical element 20, the reflected light is converted into the second circularly polarized light CP2 which is opposite to the first circularly polarized light CP1. The second circularly polarized light CP2 reflected by the holographic optical element 20 passes the first retardation plate R1 to be converted into the second linear polarized light LP2, and is absorbed by the display panel 2.

The second linear polarized light LP2 which has passed the second retardation plate R2 passes the transparent solid TS, and is reflected by the reflective polarizer PR. The second linear polarized light LP2 reflected by the reflective polarizer PR passes the transparent solid TS, and then, passes the second retardation plate R2 to be converted into the first circularly polarized light CP1.

The first circularly polarized light CP1 which has passed the second retardation plate R2 is partly reflected/diffracted by the holographic optical element 20 while the other part thereof passes the holographic optical element 20. When the first circularly polarized light CP1 is reflected/diffracted by the holographic optical element 20, the reflected/diffracted light is converted into the second circularly polarized light CP2. The second circularly polarized light CP2 reflected by the holographic optical element 20 passes the second retardation plate R2 to be converted into the first linear polarized light LP1.

Note that the first circularly polarized light CP1 which has passed the holographic optical element 20 passes the first retardation plate R1 to be converted into the first linear polarized light LP1.

The first linear polarized light LP1 which has passes the second retardation plate R2 passes the transparent solid TS, and then, passes the reflective polarizer PR, and is focused onto the eyes E of a user by a lens effect.

The third structural example described as above can achieve the same advantages of the first structural example described above.

Note that, the first linear polarized light LP1 explained with reference to FIG. 10 may be replaced with the second linear polarized light LP2, or the first circularly polarized light CP1 may be replaced with the second circularly polarized light CP2.

In the first to third structural examples explained above, the illumination device 3 may include a plurality of light emitting elements along the side surfaces of the light guide plate, or may include a plurality of light emitting elements LD arranged immediately below the display panel. For example, FIG. 11 illustrates only the main parts of the illumination device 3.

The illumination device 3 includes a light guide plate LG, and a plurality of light emitting elements LD. The light emitting elements LD are each opposed to the side surface LGS of the light guide plate LG. The light emitting element LD includes a first light emitting element LDB to emit blue wave (first wave) light, second light emitting element LDG to emit green wave (second wave) light, and third light emitting element LDR to emit red wave (third wave) light. The first light emitting element LDB, second light emitting element LDG, and third light emitting element LDR are arranged at intervals.

The light emitted from the light emitting element LD is desired to have a narrow spectrum width (or high color purity). Thus, as a light emitting element LD, a laser light source is preferred. The center wavelength of the blue laser beam emitted from the first light emitting element (first laser element) LDB is $\lambda b$, the center wavelength of the green laser beam emitted from the second light emitting element (second laser element) LDG is $\lambda g$, and the center wavelength of the red laser beam emitted from the third light emitting element (third laser element) LDR is $\lambda r$.

FIG. 12 is a cross-sectional view of a variant of the display device DSP. The variant here includes, as compared to the second structural example of FIG. 5, the display device DSP with a plurality of liquid crystal elements. For example, if the illumination device 3 including the first light emitting element LDB, second light emitting element LDG, and third light emitting element LDR of FIG. 12 is applied, the display device DSP includes a first liquid crystal element 10B, second liquid crystal element 10G, and third liquid crystal element 10R. The first liquid crystal element 10B, second liquid crystal element 10G, and third liquid crystal element 10R are layered in the third direction Z while the order of layering is arbitrary.

The first liquid crystal element 10B applies half-wave retardation to the light of blue wave (first wave) $\lambda b$, and has a lens effect to condense the first circularly polarized light of blue wave $\Delta b$. That is, the retardation of the first liquid crystal element 10B is optimized to correspond to the center wavelength $\Delta b$ of the blue laser beam emitted from the first light emitting element LDB.

Furthermore, the second liquid crystal element 10G applies half-wave retardation to the light of green wave (second wave) $\lambda g$, and has a lens effect to condense the first circularly polarized light of green wave $\lambda g$. That is, the retardation of the second liquid crystal element 10G is optimized to correspond to the center wavelength $\lambda g$ of the green laser beam emitted from the second light emitting element LDG. Thus, the retardation of the second liquid crystal element 10G is greater than the retardation of the first liquid crystal element 10B.

Furthermore, the third liquid crystal element 10R applies half-wave retardation to the light of red wave (third wave) $\lambda r$, and has a lens effect to condense the first circularly polarized light of red wave $\lambda r$. That is, the retardation of the third liquid crystal element 10R is optimized to correspond to the center wavelength $\lambda r$ of the red laser beam emitted from the third light emitting element LDR. Thus, the retardation of the third liquid crystal element 10R is greater than the retardation of the second liquid crystal element 10G.

With the above variant, the display device DSP includes multiple liquid crystal elements 10B, 10G, and 10R corresponding to the wavelengths of the light emitted from the light emitting elements LD of the illumination device 3, and thus, the color images can be efficiently focused on the eyes.

Hereinafter, other variants will be explained.

Figure 13:
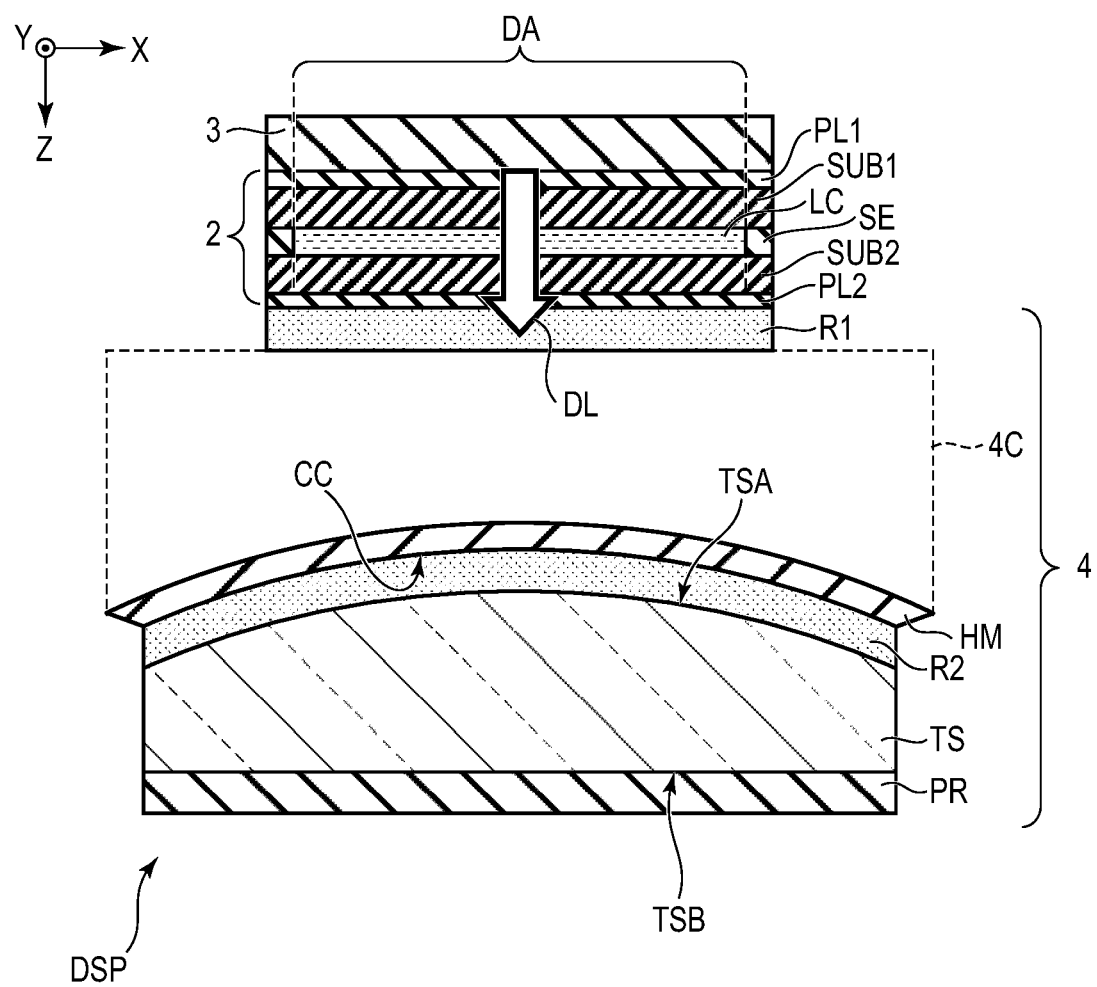
FIG. 13 is a cross-sectional view of a variant of the display device DSP.

FIG. 13 is a cross-sectional view of a variant of the display device DSP. In the variant here, as compared to the first structural example of FIG. 3, the transparent solid TS and the second retardation plate R2 are switched. That is, the second retardation plate R2 is arranged in the concave surface CC of the transflective layer HM. In the example of FIG. 13, the second retardation plate R2 contacts the concave surface CC, and the transparent solid TS is disposed between the second retardation plate R2 and the reflective polarizer PR. The transparent solid TS includes a convex first surface TSA contacting the second retardation plate R2 opposed to the concave surface CC, and a flat second surface TSB contacting the reflective polarizer PR. That is, in the first structural example, the transparent solid TS shall be arranged between the transflective layer HM and the reflective polarizer PR.

In such a variant, the same advantages achieved in the first structural example can be achieved.

FIG. 14 is a cross-sectional view of a variant of the display device DSP. In the variant here, as compared to the second structural example of FIG. 5, the transparent solid TS and the second retardation plate R2 are switched. That is, the second retardation plate R2 is arranged between the reflective polarizer PR and the transparent solid TS. In the example of FIG. 14, the second retardation plate R2 contacts the reflective polarizer PR, and the transparent solid TS is disposed between the transflective layer HM and the second retardation plate R2, and includes a flat first surface TSA contacting the transflective layer HM, and a flat second surface TSB contacting the second retardation plate R2. That is, in the second structural example, the transparent solid TS shall be arranged between the transflective layer HM and the reflective polarizer PR.

In such a variant, the same advantages achieved in the second structural example can be achieved.

FIG. 15 is a cross-sectional view of a variant of the display device DSP. In the variant here, as compared to the third structural example of FIG. 9, the transparent solid TS and the second retardation plate R2 are switched. That is, the second retardation plate R2 is arranged between the reflective polarizer PR and the transparent solid TS. In the example of FIG. 15, the second retardation plate R2 contacts the reflective polarizer PR, and the transparent solid TS is disposed between the holographic optical element 20 and the second retardation plate R2, includes a flat first surface TSA contacting the holographic optical element 20, and a flat second surface TSB contacting the second retardation plate R2. That is, in the third structural example, the transparent solid TS shall be arranged between the holographic optical element 20 and the reflective polarizer PR.

In such a variant, the same advantages achieved in the third structural example can be achieved.

As described above, according to the present embodiment, deterioration of the display quality can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a display panel configured to emit display light of linear polarization;
    a first retardation plate opposed to the display panel;
    a second retardation plate apart from the first retardation plate;
    a reflective polarizer configured to pass first linear polarized light, and to reflect second linear polarized light which is orthogonal to the first linear polarized light;
    a transflective layer disposed between the first retardation plate and the second retardation plate to be apart from the second retardation plate, and including a concave surface opposed to the second retardation plate; and
    a transparent solid disposed between the transflective layer and the reflective polarizer, with almost zero refractive anisotropy, wherein
    the first retardation plate and the second retardation plate are a quarter-wave plate, and
    the transparent solid includes a first surface shaped convex to be opposed to the concave surface, and a second surface opposed to the reflective polarizer.

2. The display device of claim 1, wherein
    the second retardation plate contacts the reflective polarizer,
    the transparent solid is disposed between the transflective layer and the second retardation plate,
    the first surface contacts the concave surface, and
    the second surface contacts the second retardation plate.

3. The display device of claim 1, wherein
    the second retardation plate contacts the concave surface,
    the transparent solid is disposed between the second retardation plate and the reflective polarizer,
    the first surface contacts the second retardation plate, and
    the second surface contacts the reflective polarizer.

4. A display device comprising:
    a display panel configured to emit display light of linear polarization;
    a first retardation plate opposed to the display panel;
    a transflective layer contacting the first retardation plate;
    a second retardation plate;
    a reflective polarizer configured to pass first linear polarized light and to reflect second linear polarized light which is orthogonal to the first linear polarized light;
    an element with a lens effect to collect first circularly polarized light;
    a third retardation plate disposed between the reflective polarizer and the element; and
    a transparent solid disposed between the transflective layer and the reflective polarizer, with almost zero refractive anisotropy, wherein
    the first retardation plate, the second retardation plate, and the third retardation plate are a quarter-wave plate, and
    the transparent solid includes a first surface opposed to the transflective layer and a second surface opposed to the reflective polarizer.

5. The display device of claim 4, wherein
    the second retardation plate contacts the transflective layer,
    the transparent solid is disposed between the second retardation plate and the reflective polarizer,
    the first surface contacts the second retardation plate, and
    the second surface contacts the reflective polarizer.

6. The display device of claim 4, wherein
    the second retardation plate contacts the reflective polarizer,
    the transparent solid is disposed between the transflective layer and the second retardation plate,
    the first surface contacts the transflective layer, and
    the second surface contacts the second retardation plate.

7. A display device comprising:
    a display panel configured to emit display light of linear polarization;
    a first retardation plate opposed to the display panel;
    a holographic optical element contacting the first retardation plate;
    a second retardation plate;
    a reflective polarizer configured to pass first linear polarized light, and to reflect second linear polarized light which is orthogonal to the first linear polarized light; and
    a transparent solid disposed between the holographic optical element and the reflective polarizer, with almost zero refractive anisotropy, wherein
    the first retardation plate and the second retardation plate are a quarter-wave plate, and
    the transparent solid includes a first surface opposed to the holographic optical element and a second surface opposed to the reflective polarizer.

8. The display device of claim 7, wherein
    the second retardation plate contacts the holographic optical element,
    the transparent solid is disposed between the second retardation plate and the reflective polarizer,
    the first surface contacts the second retardation plate, and
    the second surface contacts the reflective polarizer.

9. The display device of claim 7, wherein
    the second retardation plate contacts the reflective polarizer,
    the transparent solid is disposed between the holographic optical element and the second retardation plate,
    the first surface contacts the holographic optical element, and
    the second surface contacts the second retardation plate.

10. The display device of claim 1, wherein
    the transparent solid has an isotropic refractive index, and
    the refractive index is substantially equal to a refractive index of the second retardation plate.

11. The display device of claim 10, wherein the transparent solid is formed of a polymer.

12. The display device of claim 10, wherein the first surface and the second surface of the transparent solid extend over a range which is greater than a display area of the display panel.

13. The display device of claim 4, wherein
the element includes a liquid crystal layer which is cured while alignments of a plurality of liquid crystal molecules including first liquid crystal molecule and second liquid crystal molecule are fixed therein,
the liquid crystal layer includes, in a plan view, a first ring-shaped area in which the first liquid crystal molecules are aligned in the same direction, and a second ring-shaped area in which the second liquid crystal molecules are aligned in the same direction outside the first ring-shaped area, and
the alignment of the first liquid crystal molecules is different from the alignment of the second liquid crystal molecules.

14. The display device of claim 4, wherein
the transparent solid includes an isotropic refractive index, and
the refractive index is substantially equal to a refractive index of the second retardation plate.

15. The display device of claim 14, wherein the transparent solid is formed of a polymer.

16. The display device of claim 14, wherein the first surface and the second surface of the transparent solid extend over a range which is greater than a display area of the display panel.

17. The display device of claim 7, wherein
the transparent solid includes an isotropic refractive index, and
the refractive index is substantially equal to a refractive index of the second retardation plate.

18. The display device of claim 17, wherein the transparent solid is formed of a polymer.

19. The display device of claim 17, wherein the first surface and the second surface of the transparent solid extend over a range which is greater than a display area of the display panel.

* * * * *